United States Patent [19]

Goda

[11] 3,918,490
[45] Nov. 11, 1975

[54] FLUID SWITCHING APPARATUS

[76] Inventor: George Goda, 390 First Ave., New York, N.Y. 10010

[22] Filed: Dec. 20, 1973

[21] Appl. No.: 426,829

[52] U.S. Cl. ............... 137/597; 137/240; 137/607; 251/6; 251/9
[51] Int. Cl.² ........................................ F16K 7/06
[58] Field of Search ........................... 251/4–10; 417/476, 477; 137/240, 597, 607

[56] References Cited
UNITED STATES PATENTS

| | | | |
|---|---|---|---|
| 1,686,003 | 10/1928 | Hottinger | 251/6 X |
| 2,899,905 | 8/1959 | Becher | 417/477 |
| 3,012,701 | 12/1961 | Weber | 251/7 X |
| 3,411,534 | 11/1968 | Rose | 251/9 X |
| 3,591,319 | 7/1971 | Shlisky | 417/477 |

FOREIGN PATENTS OR APPLICATIONS

| | | | |
|---|---|---|---|
| 968,186 | 8/1964 | United Kingdom | 137/240 |
| 845,292 | 7/1952 | Germany | 251/4 |

*Primary Examiner*—Martin P. Schwadron
*Assistant Examiner*—Richard Gerard
*Attorney, Agent, or Firm*—Esq. Novack

[57] ABSTRACT

A fluid switching apparatus for receiving fluids from a first plurality of source lines and a second plurality of source lines and for switchably routing the fluids from one of the pluralities of source lines to a plurality of output lines. In accordance with the invention there is provided a housing and a first plurality of flexible tubes having inlet and outlet ends, the tubes being mounted in the housing in substantially parallel relationship with the inlet ends of the tubes being adapted for coupling to the first plurality of source lines. A second plurality of flexible tubes having inlet and outlet ends are mounted in the housing in substantially parallel relationship and spaced from the first plurality of tubes with the inlet ends adapted for coupling to the second plurality of source lines. Means are provided for coupling the outlet ends of the first plurality of tubes to the outlet ends of the second plurality of tubes so as to form a plurality of common outlets, the common outlets being adapted for coupling to the plurality of output lines. An elongated cam is rotatably mounted in the housing between the first plurality of tubes and the second plurality of tubes and transverse the direction of flow of all of the tubes. The cam is proportioned to normally compress all of the first and second plurality of tubes and is rotatable to positions whereby either the first or the second plurality of tubes is released from compression to allow flow therein. In a preferred embodiment of the invention there is further provided an elongated flexible sleeve surrounding the cam and forming a friction tube as between the cam and the first and second pluralities of flexible tubes.

5 Claims, 4 Drawing Figures

FLUID SWITCHING APPARATUS

BACKGROUND OF THE INVENTION

This invention relates to fluid switching systems and, more particularly, to a fluid switching apparatus for receiving fluids from a first plurality of source lines and a second plurality of source lines and for switchably routing the fluids from one of the pluralities of source lines to a plurality of output lines.

There are various applications in which it is desirable to have the capability of switching between different fluid source lines which feed common output lines. In clinical blood analyzers, for example, there are numerous reagent lines through which chemicals flow. During use of such analyzers, it is necessary several times a day to "wash" the reagent lines of the system. This is generally accomplished by passing distilled water through the lines. In the past, it was common procedure to manually remove all lines from reagent supply containers and place the lines in a container of distilled water. The distilled water was then pumped, by natural action of the system, through the lines to accomplish the desired flushing. This technique, in addition to being time consuming and troublesome, was found to be subject to human error. Recently, a valve system was developed whereby the reagent lines could be simultaneously "switched" between their regular reagent sources and source of a wash liquid. The developed system employs a multiple-stopcock type of valve system in which a number of input passages enter a chamber and a number of output passages leave the chamber. A valve member in the chamber is rotatable to direct the flow as between the desired input and output passages while simultaneously blocking other passages that are to be inoperative for the particular valve position. There are various problems associated with this arrangement, however. The system is found to be expensive as it requires relatively close tolerances of the valve member in the flow chamber to assure against leaks. Even expensive systems are of doubtful reliability and susceptible to leakage or contamination. It is accordingly one object of this invention to provide an improved fluid switching apparatus that can be utilized in conjunction with clinical blood analyzers or the like.

SUMMARY OF THE INVENTION

The present invention is directed to an improved fluid switching apparatus for receiving fluids from a first plurality of source lines and a second plurality of source lines and for switchably routing the fluids from one of the pluralities of source lines to a plurality of output lines. In accordance with the invention there is provided a housing and a first plurality of flexible tubes having inlet and outlet ends, the tubes being mounted in the housing in substantially parallel relationship with the inlet ends being adapted for coupling to the first plurality of source lines. A second plurality of flexible tubes, also having inlet and outlet ends, are mounted in the housing in substantially parallel relationship and spaced from the first plurality of tubes. The inlet ends of the second plurality of tubes are adapted for coupling to the second plurality of source lines. Means are provided for coupling the outlet ends of the first plurality of tubes to the outlet ends of the second plurality of tubes so as to form a plurality of common outlets, the common outlets being adapted for coupling to the plurality of output lines. An elongated cam is rotatably mounted in the housing between the first plurality of tubes and the second plurality of tubes and transverse the direction of flow of all of the tubes. The cam is proportioned to normally compress all of the first and second plurality of tubes and rotatable to positions whereby either the first or the second plurality of tubes is released from compression to allow flow therein.

In a preferred embodiment of the invention there is further provided an elongated flexible sleeve surrounding the cam and forming a friction tube as between the cam and the first and second pluralities of flexible tubes. In this embodiment there are further provided first and second elongated members which are respectively disposed between the first and second pluralities of flexible tubes and opposite surfaces of the housing. The elongated members are oriented parallel to the cam so that the cam normally compresses the tubes against the members.

Further features and advantages of the invention will become more readily apparent from the following detailed description when taken in conjunction with the accompanying drawings.

DESCRIPTION OF THE PREFERRED EMBODIMENT

Figure 1:
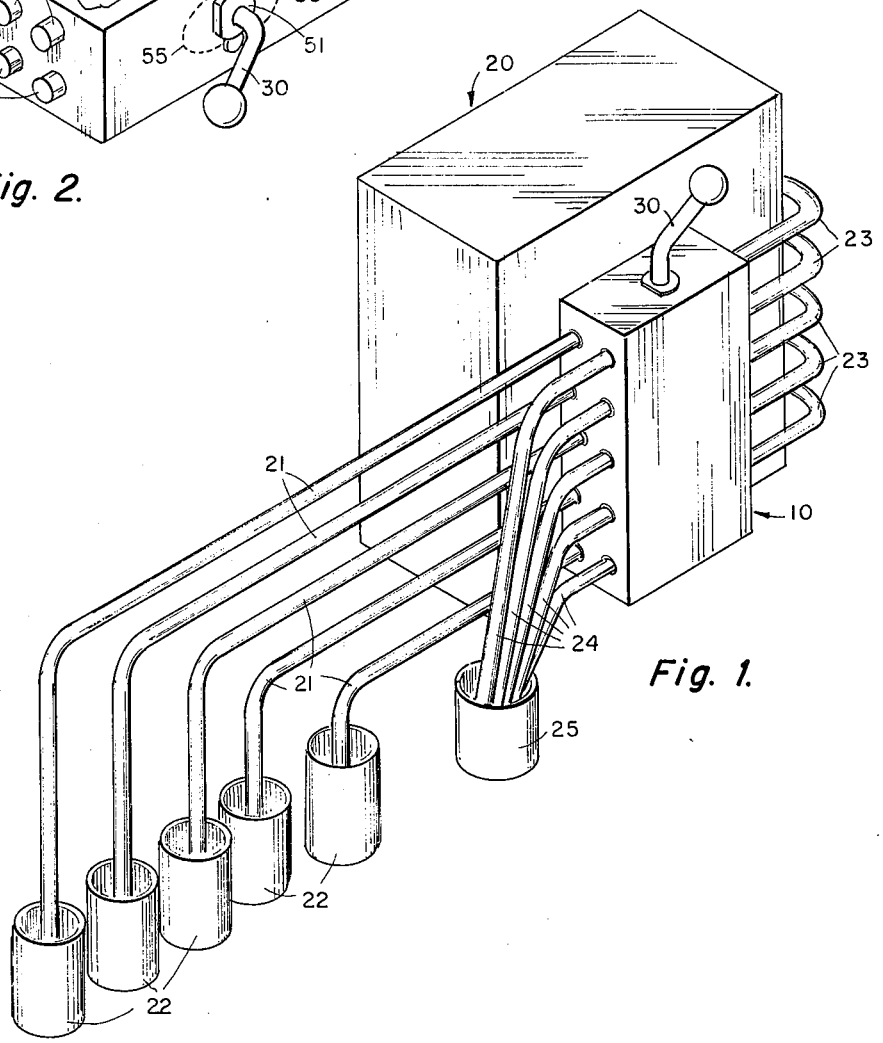
FIG. 1 depicts the fluid switching apparatus of the invention being used in conjunction with a clinical analyzer.

Referring to FIG. 1, there is shown an embodiment of a fluid switching apparatus 10 in accordance with the present invention, the apparatus being mounted on and utilized in conjunction with a clinical analyzer generally indicated by the reference numeral 20. Typically, the clinical analyzer will be fed by a number of reagent source lines or tubes 21, there being only five of such tubes shown for simplicity of illustration. The reagent lines 21 feed the clinical analyzer 20 with chemicals from reagent supply containers designated by the reference numeral 22. During ordinary operation of the clinical analyzer 20, the reagents in source lines 21 flow through the fluid switching apparatus 10 to the five output lines 23 to places in the analyzer 20 where these chemicals are utilized. The switching apparatus 10 also receives a second plurality of source lines 24 which originate in a supply container 25 which contains, for example, distilled water. When the switch control handle 30 is moved to a preselected position, as will become apparent, the flow to the output lines 23 can be stopped. When the switch control handle 30 is moved to still another preselected position, all five output lines 23 are fed the distilled water from the five source lines 24. In this manner, the operator can, by a simple handle control, change the status of flow into the output lines 23 in accordance with his selection, or can stop the flow altogether.

Figure 2:
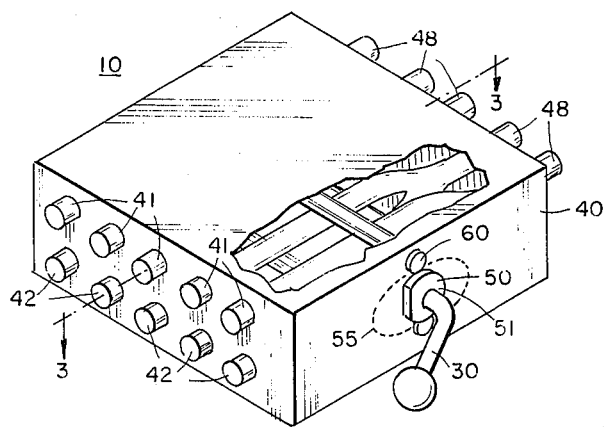
FIG. 2 is an elevational perspective view of a fluid switching apparatus in accordance with an embodiment of the invention.
Figure 3:
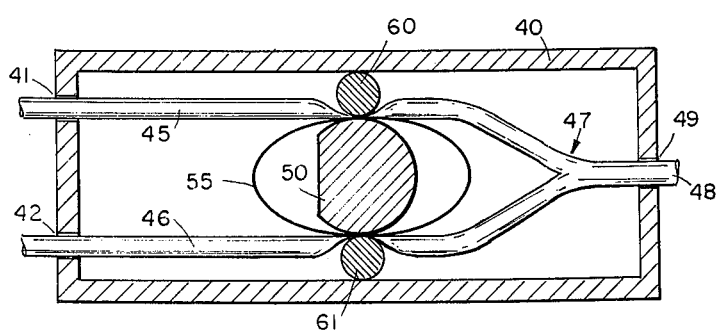

Referring to FIGS. 2 and 3 there are shown details of the fluid switching apparatus of the present embodiment. A housing 40 which may be formed of rigid plastic, is provided at one end with a row of five small apertures 41 and a second row of five small apertures 42 located below and spaced from the apertures 41. A first plurality of flexible tubes 45 are fitted through the apertures 41 and lie in parallel relationship within the housing 40. A second plurality of flexible tubes 46 are fitted through the apertures 42 and also lie in parallel relationship within the housing 40 and spaced from the plurality of tubes 45. In the cross-section of FIG. 3, only single ones of the apertures 41 and 42 and the tubes 45 and 46 are visible. Each companion pair of tubes 45 and 46 has an outlet end which is coupled into a "Y" connector 47 which leads to a common outlet 48. In the present embodiment there are five Y-connectors 47 and five common outlets 48 which emerge through apertures 49 at the opposite end of the housing 40.

An elongated cam member 50, which may be formed of steel, is mounted in the housing between the upper plurality of tubes 45 and the lower plurality of tubes 46 and transverse the direction of these tubes. The cam 50 is provided with a fitting 51 which are proportioned to be received in a circular aperture in the side of housing 40 as seen in FIG. 2. The end of cam 50 is coupled to the handle 30 which facilitates the turning of the cam. An elongated oval-shaped sleeve 55, which may be formed of Teflon, surrounds the cam 50 and forms an interface between the cam and the ten upper and lower tubes. A pair of rods 60 and 61 are mounted in the housing 40 in similar fashion to the cam 50. These rods are parallel to the cam and abut the upper and lower inner surfaces of the housing on one side while contacting the tubes 45 and 46 on their other side. The rods 60 and 61 are preferably formed of steel.

The rounded portion of cam 50 is proportioned such that the tubes 45 and 46 are normally squeezed between the cam and the rods 60 and 61 thereby preventing flow of liquid in either the upper tubes 45 or the lower tubes 46. When the flattened portion of the cam is rotated toward the tubes 45, the additional space between the cam and the rod 60 allows flow through the tubes 45 while still blocking flow in the lower tubes 46. Similarly, when the flattened portion of the cam 50 is rotated toward the lower tubes 46, the resultant space between the cam and the rod 61 allows flow in the tubes 46 while still blocking flow in the upper tubes 45. The Teflon sleeve 55 operates as a friction tube and is found to greatly reduce the wearing of the flexible tubes 45 and 46 during operation thus enhancing the life of the switching apparatus.

Figure 4:
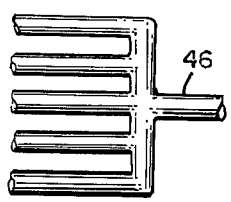
FIG. 3 is a cross-sectional view of the embodiment of FIG. 2 as taken through a section defined by arrows 3—3 and FIG. 4 shows a branch conductor used in conjunction with the invention.

The invention has been described with reference to a particular embodiment, but it will be appreciated that variations within the spirit and scope of the invention will occur to those skilled in the art. For example, it is evident that the second plurality of source lines 24 could be a single line utilized in conjunction with a branch connector which feeds the five lower flexible lines 46. Alternatively, a single line 46 could branch into five outlet tubes, as shown in FIG. 4, which would, in turn, be coupled to the five upper flexible tubes 45 by means of the Y-connectors 47. In such case, it would only be necessary to have this single flexible tube 46 pass between the cam 50 and the lower rod 61.

I claim:

1. A fluid switching apparatus for receiving fluids from a first plurality of source lines and a second plurality of source lines and for switchably routing the fluids from one of the pluralities of source lines to a plurality of output lines, comprising:
   a housing
   a first plurality of flexible tubes having inlet and outlet ends, said tubes being mounted in said housing in substantially parallel relationship, said inlet ends being adapted for coupling to said first plurality of source lines;
   a second plurality of flexible tubes having inlet and outlet ends, said second plurality of tubes being mounted in said housing in substantially parallel relationship and spaced from said first plurality of tubes, the inlet ends of said second plurality of tubes being adapted for coupling to said second plurality of source lines;
   means for coupling the outlet ends of the first plurality of tubes to the outlet ends of the second plurality of tubes so as to form a plurality of common outlets, said common outlets being adapted for coupling to said plurality of output lines;
   an elongated cam rotatably mounted in said housing between said first plurality of tubes and said second plurality of tubes and transverse the direction of flow of all of said tubes;
   first and second elongated members, said first member disposed between said first plurality of flexible tubes and a surface of said housing and said second member disposed between said second plurality of flexible tubes and an opposite surface of said housing, said members being oriented parallel to said cam; and
   an elongated flexible sleeve surrounding said cam and forming a friction tube as between said cam and said first and second pluralities of flexible tubes;
   said cam being proportioned to normally compress all of said first and second plurality tubes and rotatable to positions whereby either of said first or said second plurality of tubes is released from compression to allow flow therein.

2. The apparatus as defined by claim 1 wherein said flexible sleeve is formed of Teflon.

3. The apparatus as defined by claim 2 wherein said first and second elongated members are steel rods.

4. The apparatus as defined by claim 1 wherein said first and second elongated members are steel rods.

5. A fluid switching apparatus for receiving fluids from a first plurality of source lines and at least one secondary source line and for switchably routing fluids from either the first plurality of source lines or the secondary source line to a plurality of output lines, comprising:
   a housing;
   a first plurality of flexible tubes having inlet and outlet ends, said tubes being mounted in said housing in substantially parallel relationship, said inlet ends being adapted for coupling to said first plurality of source lines;
   at least one secondary flexible tube having inlet and outlet ends, said secondary tube being mounted in said housing and spaced from said first plurality of tubes, the inlet end of said secondary tube being adapted for coupling to said secondary source line;
   means for coupling the output ends of the first plurality of tubes to the outlet end of the secondary tube so as to form a plurality of common outlets, said common outlets being adapted for coupling to said plurality of output lines;

an elongated cam rotatably mounted in said housing between said first plurality of tubes and said secondary tube and transverse the direction of flow of all of said tubes;

first and second elongated members, said first member disposed between said first plurality of flexible tubes and a surface of said housing and said second member disposed between said secondary flexible tube and an opposite surface of said housing, said members being oriented parallel to said cam; and an elongated flexible sleeve surrounding said cam and forming a friction tube as between said cam and said first plurality of tubes and said secondary tube;

said cam being proportioned to normally compress said first plurality of tubes and said secondary tube and rotatable to positions whereby either said first plurality of tubes or said secondary tube is released from compression to allow flow therein.

* * * * *